United States Patent [19]

Shiga et al.

[11] Patent Number: 4,846,014

[45] Date of Patent: Jul. 11, 1989

[54] CRANKSHAFT MECHANISM HAVING A VARIABLE STROKE AND A PRESS EMPLOYING SAID MECHANISM

[75] Inventors: Masakatsu Shiga, Machida; Masayoshi Sugawara, Sagamihara, both of Japan

[73] Assignee: Aida Engineering, Ltd., Sagamihara, Japan

[21] Appl. No.: 64,611

[22] Filed: Jun. 22, 1987

[30] Foreign Application Priority Data

Jun. 30, 1986 [JP] Japan .......................... 61-100002[U]
Dec. 16, 1986 [JP] Japan .......................... 61-193621[U]

[51] Int. Cl.[4] .......................... F16C 3/04; G05G 1/00; G30B 5/00; B26D 5/16

[52] U.S. Cl. .......................... 74/595; 74/579 R; 74/597; 83/628; 83/530; 100/2.57; 100/282

[58] Field of Search .......................... 74/595-603, 74/579 R, 579 E, 583, 585; 83/628, 530; 100/282, 257; 123/192 B

[56] References Cited

U.S. PATENT DOCUMENTS

| | | | |
|---|---|---|---|
| 3,147,638 | 9/1964 | Rice | 74/595 |
| 3,302,505 | 2/1967 | Shiokawa | 100/282 X |
| 3,765,266 | 10/1973 | Carlise | 83/530 X |
| 3,886,829 | 6/1975 | Criblez | 83/628 X |
| 4,135,446 | 1/1979 | Bareis et al. | 83/530 X |
| 4,156,387 | 5/1979 | Portmann | 100/282 X |
| 4,354,411 | 10/1982 | Griese et al. | 83/530 X |
| 4,748,883 | 6/1988 | Portmann | 83/628 X |
| 4,761,988 | 8/1988 | Kato | 100/282 X |
| 4,785,732 | 11/1988 | Czapka et al. | 100/257 |
| 4,791,830 | 12/1988 | Yamamoto et al. | 100/257 X |

FOREIGN PATENT DOCUMENTS

| | | | |
|---|---|---|---|
| 0250871 | 1/1988 | European Pat. Off. | 100/257 |
| 60-180699 | 9/1985 | Japan | 100/282 |
| 191614 | 3/1967 | U.S.S.R. | 74/595 |
| 194496 | 4/1967 | U.S.S.R. | 74/595 |
| 439126 | 3/1979 | U.S.S.R. | 100/282 |
| 837863 | 6/1981 | U.S.S.R. | 83/530 |

OTHER PUBLICATIONS

Press Binran (Press Handbook) published by Maruzen Kabushiki Kaisha of Nihombashi, Chuo-ku, Tokyo, Japan on Oct. 30th, 1967, pp. 261-261, FIG. 3.26(W) and (X).

*Primary Examiner*—Vinh Luong
*Attorney, Agent, or Firm*—Spencer & Frank

[57] ABSTRACT

A crankshaft mechanism for use with a press having a slide member which comprises an eccentric crankshaft having first and second cylindrical portions. The first portion is rotatable within a housing about a longitudinal axis and the second portion, of greater diameter than the first portion, has a center which is displaced radially from the longitudinal axis. An eccentric sheave is rotatably mounted on the outer circumference of the second portion of the crankshaft, and a connecting member is rotatably mounted on the outer circumference of the sheave. The second portion of the crankshaft, sheave and connecting member are provided with first, second and third radial bores respectively which are in alignment when the crankshaft is at its bottom dead center position. A locking pin slides within the radial bores and is displaceable by an actuator to a first position in which the crankshaft is connected to the sheave and a second position in which the sheave is connected to the connecting member. In the first position, the connecting member is free for movement with respect to the sheave and in the second position the sheave is free for movement with respect to the crankshaft. In addition, an auxiliary stop position correcting device is provided for stopping the slide member at a predetermined position.

3 Claims, 4 Drawing Sheets

PRIOR ART

CRANKSHAFT MECHANISM HAVING A VARIABLE STROKE AND A PRESS EMPLOYING SAID MECHANISM

BACKGROUND OF THE INVENTION

This invention relates to a crankshaft mechanism having a variable displacement or stroke. In particular, it relates to a crankshaft mechanism for a press having a slide member driven by the crankshaft mechanism wherein the mechanism can be adjusted for either a minimum or a maximum stroke.

The stroke of a crankshaft, and therefore the displacement of the slide member, is defined as the distance the crankshaft moves between its top dead center and bottom dead center positions. This distance determines the maximum depth of drawing when the press is used to implement a drawing process, the maximum height available for a container edge turning process and the maximum length of the article produced by a backward extrusion process.

Variable stroke crankshaft mechanisms have been developed wherein an outer eccentric sheave is fixed to a crankshaft by a cylindrical key after the position of the crankshaft relative to the sheave has been set. Crankshafts are also known in which the sheave is fixed to the crankshaft by radial engagement. Crankshafts of the first type are shown at FIGS. 3.26(W) and (X), pages 261-262, of Press Binran (Press Handbook) published by Maruzen Kabushiki Kaisha of Nihombashi, Chuo-ku, Tokyo, Japan on Oct. 30th, 1967, and crankshafts of the radial engagement type are shown at FIGS. 3.26(Y) and (Z) of this text. These crankshafts utilize double eccentricity and produce phased displacements of the slide member.

FIG. 6A is a sectional view of a variable stroke crankshaft mechanism of the type wherein after adjustment the outer eccentric sheave is fixed to a crankshaft by a cylindrical key, as exemplified by FIG. 3.26(W) of the Press Handbook, and FIG. 6B is a sectional view taken along the line VIB—VIB of FIG. 6A. In FIGS. 6A and 6B, S is a crankshaft having a small diameter portion and a large diameter portion, and P is an eccentric sheave rotatably mounted on the large diameter portion of the crankshaft. A plurality of grooves g are cut in the interface between the sheave P and crankshafts for receiving a key k secured to the sheave by a set screw. In order to adjust the stroke of the crankshaft, the set screw is loosened and the key k removed from the groove g. The sheave P is then rotated with respect to the crankshaft by insertion of a rod in a hole h, and the key k engaged with a different groove g.

Although the above-described structures are advantageous in that they can make phased changes in the stroke, it is difficult to adjust the stroke, and the time required to make the adjustment is relatively long.

Accordingly, it is an object of the present invention to solve the above-described problems by providing a crankshaft mechanism wherein the stroke can be instantaneously and easily adjusted for either a long or a short stroke.

SUMMARY OF THE INVENTION

In accordance with the invention there is provided a crankshaft mechanism for use with a press having a slide member which comprises an eccentric crankshaft having first and second cylindrical portions. The first portion is rotatable within a housing about a longitudinal axis and the second portion, of greater diameter than the first portion, has a center which is displaced radially from the longitudinal axis. An eccentric sheave is rotatably mounted on the outer circumference of the second portion of the crankshaft, and a connecting member is rotatably mounted on the outer circumference of the sheave. The second portion of the crankshaft, sheave and connecting member are provided with first, second and third radial bores respectively which are in alignment when the crankshaft is at its bottom dead center position. A locking means slides within the radial bores and is displaceable by an actuating means to a first position in which the crankshaft is connected to the sheave and a second position in which the sheave is connected to the connecting member. In the first position, the connecting member is free for movement with respect to the sheave and in the second position the sheave is free for movement with respect to the crankshaft.

The invention further comprises an auxiliary stop position correcting device for stopping the slide member at a predetermined position.

DESCRIPTION OF THE PREFERRED EMBODIMENTS

Figure 1:
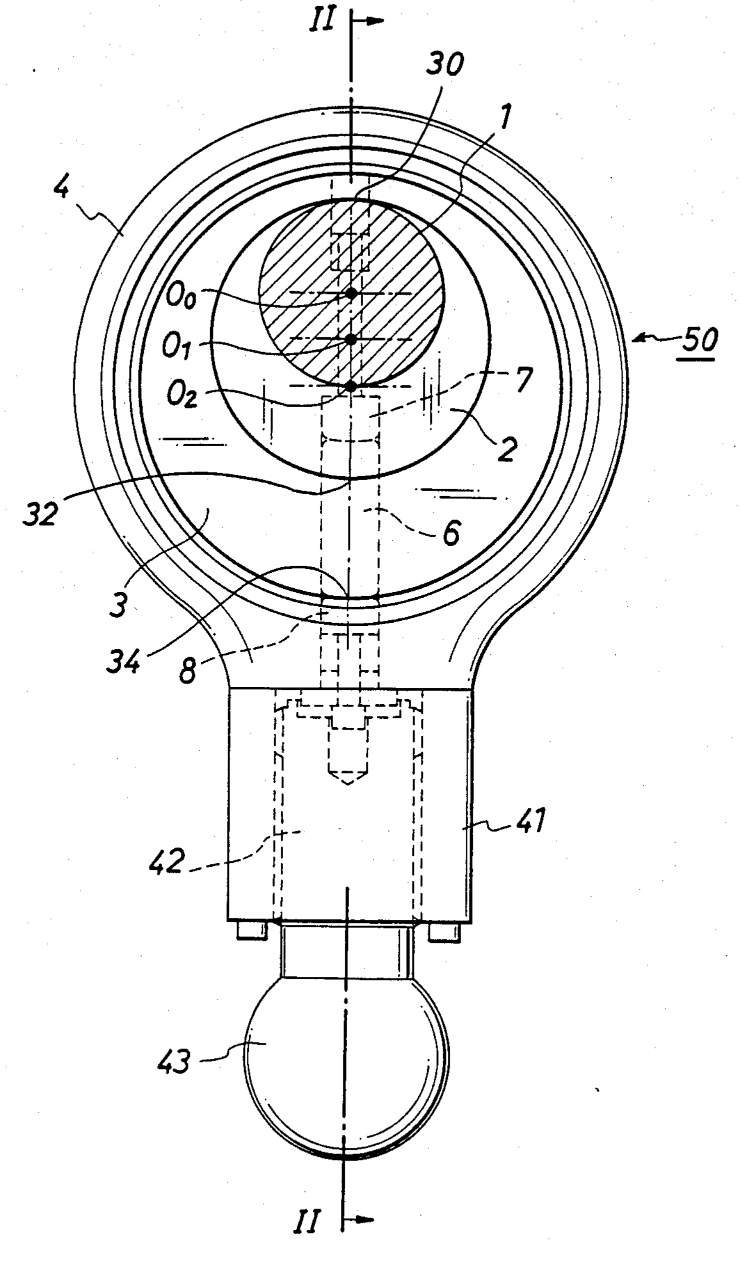
FIG. 1 is a side view of the adjustable crankshaft mechanism according to the present invention.
Figure 2:
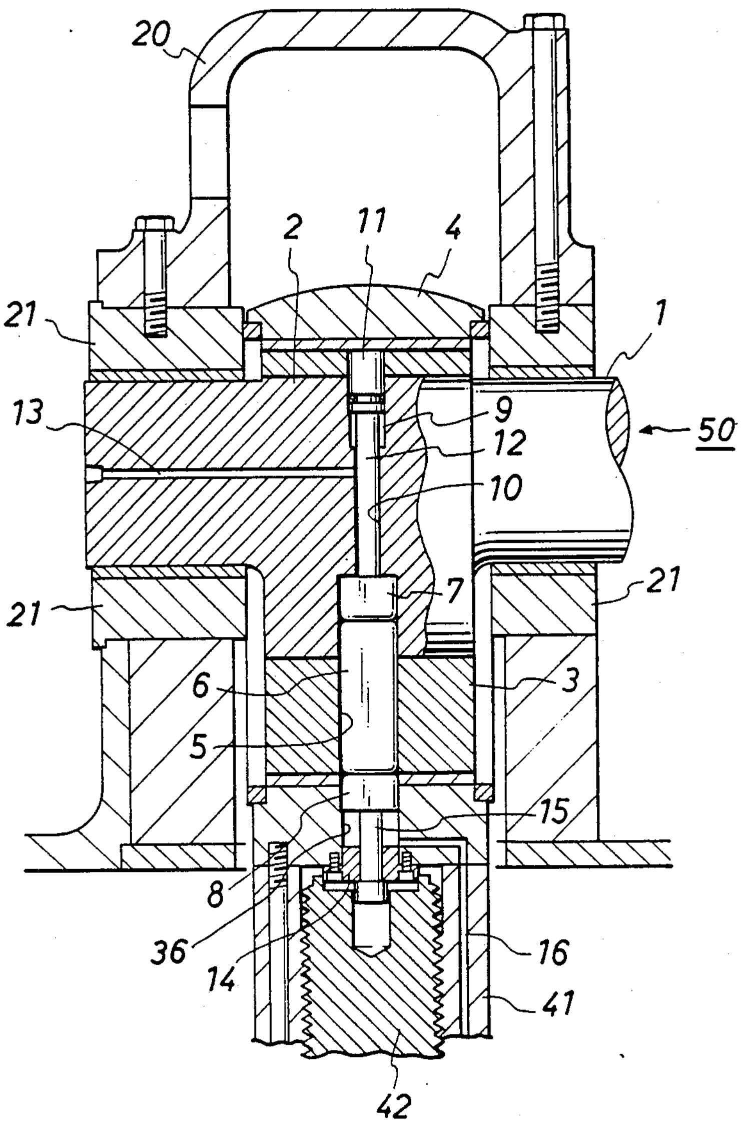
FIG. 2 is a sectional view taken on line II—II of FIG. 1.

Referring to FIGS. 1 and 2, there is shown an adjustable crankshaft mechanism 50 which comprises a cylindrical crankshaft 1 having an enlarged eccentric portion 2. The ends of the crankshaft are rotatable within bearings 21 of a housing 20 about a longitudinal axis $O_o$. The enlarged portion 2 is tangent to the smaller diameter portion of the crankshaft at 30, and has a center $O_1$ displaced radially from the longitudinal axis $O_o$.

An eccentric sheave 3 is rotatably mounted on the eccentric portion 2 of the crankshaft 1, and a connecting member 4 is rotatably mounted on the outer circumference of the sheave with the center of the opening in the connecting member 4 coinciding with the center $O_2$ of the outer diameter of the eccentric sheave 3. As shown in FIG. 1, when the crankshaft 1 is at the bottom dead center position with its portion of greatest eccentricity containing axial line 32 downward, the portion of greatest eccentricity of the sheave 3 containing axial line 34 is also downward so that the centers $O_1$, $O_2$ and the axial lines 32, 34 are on the same radial line extending from the longitudinal axis $O_o$ of crankshaft 1.

An elongated cylindrical main bore 5 (FIG. 2) extends through one side of the eccentric sheave 3 and into the eccentric portion 2 of the crankshaft 1, and a cylindrical auxiliary bore 9 extends through the opposite side of the sheave 3 and into the eccentric portion 2 of the crankshaft. The main bore 5 and auxiliary bore 9 are connected by a communication hole 10 in the eccentric portion 2 of the crankshaft, the auxiliary bore 9 having a smaller diameter than that of the main bore 5. A bore 36 having the same diameter as the bore 5 is provided in the connecting member 4. When the crankshaft is at its bottom dead center position, the bore 36, main bore 5, communication hole 10 and auxiliary bore 9 are in alignment as shown in FIGS. 1 and 2.

The lower end of the connecting member 4 is provided with an internally threaded sleeve 41 which engages with a connecting screw 42. The connecting screw 42 has a spherical body 43 at the end thereof, the spherical body 43 being adapted for connection to the slide of a press. A plug body 14 having an aperture therein is provided at the lower end of the bore 36.

A slidable lock pin 6 is positioned within the main bore 5 together with an upper piston 7 connected by a connection rod 12 to an auxiliary piston 11 located in the auxiliary bore 9. A lower piston 8 is slidably positioned within the bore 36 and is provided with a connection rod 15 which extends downward through the aperture in plug 14.

When the crankshaft mechanism is in the position shown in FIGS. 1 and 2, the lock pin 6, connection rod 12 and auxiliary piston 11 are pushed upward by the piston 8 so that the piston 11 locks the eccentric portion 2 of the crankshaft 1 to the eccentric sheave 3. Conversely, when the lock pin 6 is pushed downward by the piston 7, it enters the bore 36 in the connecting member 4, disengages the auxiliary piston 11 from the crankshaft 1 and locks the eccentric sheave 3 to the connecting member 4.

The upper piston 7 is driven downward by oil supplied to the piston through a hydraulic passage 13 having an inlet at an axial end of the crankshaft 1. The lower piston 8 is driven upward by oil supplied through a hydraulic passage 16 formed in the connecting member 4.

In the operational mode illustrated in FIGS. 1 and 2, the lockpin 6 and auxiliary piston 11 are at their upper limits with the crankshaft mechanism at the bottom dead center position and the eccentric portion 2 of the crankshaft locked to the eccentric sheave 3. Thus, the eccentric sheave 3 rotates as a part of the crankshaft 1. In this mode of operation, the rotational center of the crankshaft is $O_o$ and the center of the combined eccentric member formed by the crankshaft 1 and the eccentric sheave 3 is $O_2$. Consequently, the stroke of the connecting member 4 is $2(O_o-O_2)$, which is the longest of the two values of stroke attainable with the invention.

When the lock pin 6 is driven downward, the eccentric sheave 3 is locked to the connecting member 4. In this mode of operation, the rotational center of the crankshaft is $O_o$ and the center of the eccentric portion 2 of crankshaft 1 is $O_1$. Consequently, the stroke of the connecting member 4 is $2(O_o-O_1)$, which is the shortest of the two values of stroke attainable with the invention.

Figure 3:
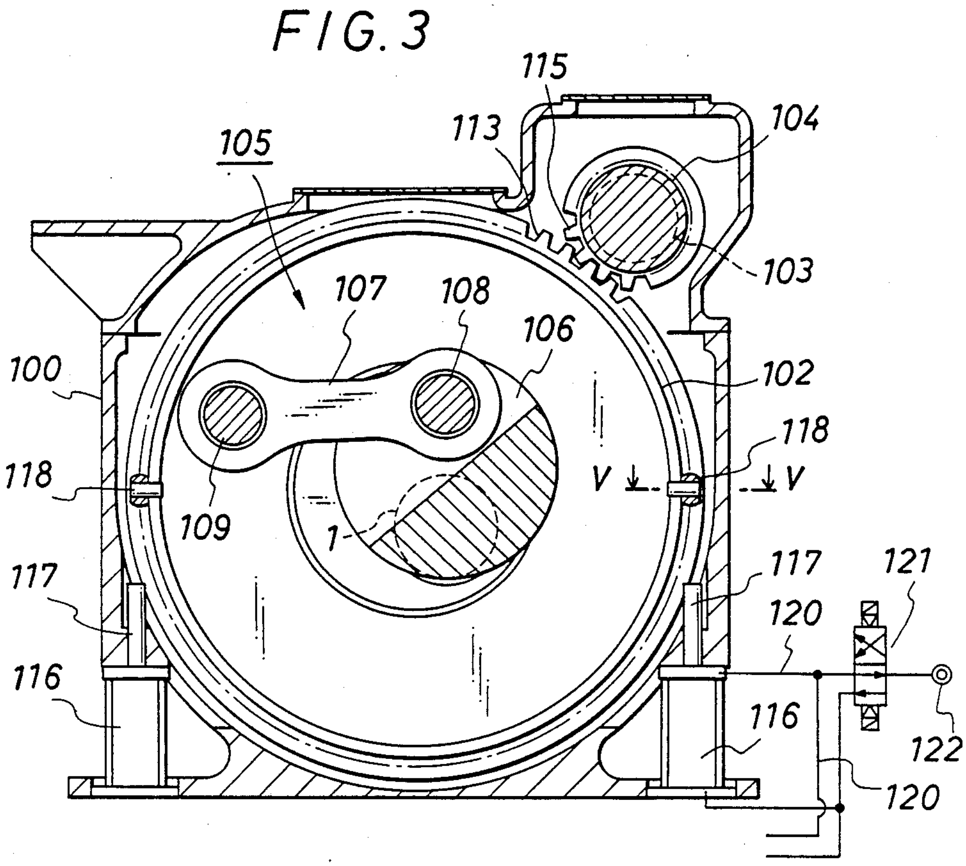
FIG. 3 is a sectional view of the crown portion of a press having an adjustable crankshaft mechanism showing a slide stop position correcting device.
Figure 4:
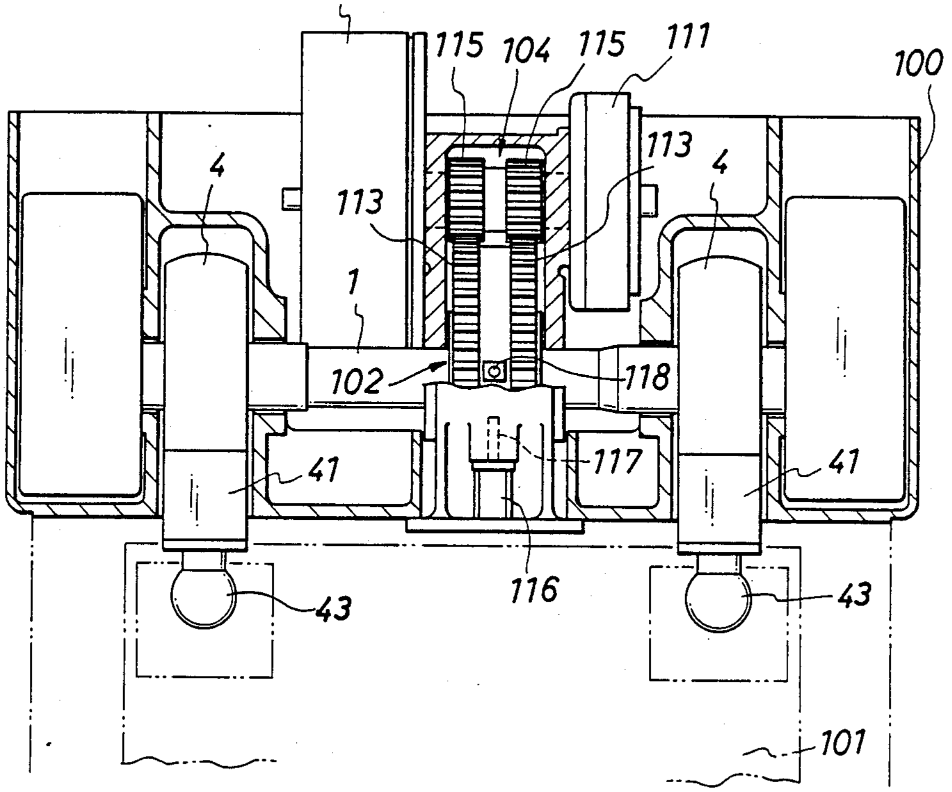
FIG. 4 is a front view of the press shown in FIG. 3.
Figure 6A:
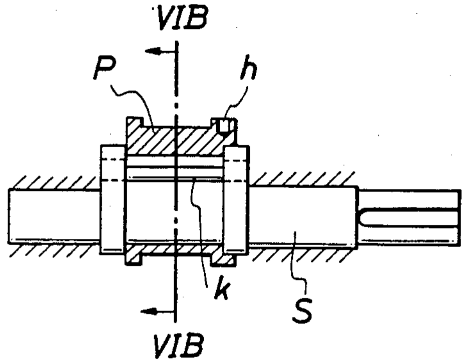
FIGS. 6A and 6B prior art adjustable crankshaft mechanisms, FIG. 6A being a sectional view and FIG. 6B being a view taken on line VIB—VIB thereof.
Figure 6B:
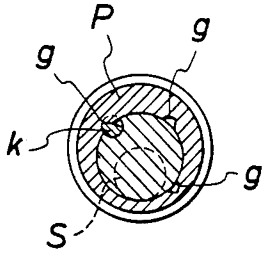
PRIOR ART FIG. 6B

Referring to FIGS. 3 and 4, there is shown a double-crank press wherein a crankshaft 1 has a connecting member 4 at each end. Each of the connecting members 4 is driven by an enlarged eccentric portion and eccentric sheave of the type illustrated in FIGS. 1 and 2 but not shown in FIGS. 3 and 4 in order to avoid crowding the drawing. The crankshaft 1 is mounted in a crown 100, and a slide 101 is connected to the two spherical bodies 43 of the connecting member 4. The slide 101 is moved up and down by the connecting member as the crankshaft 1 is rotated.

At the central portion of the crankshaft 1, between the two eccentric portions 2 (not shown) of the crankshaft, there is provided a main gearwheel 102 which is in engagement with a drive pinion 104 provided on a drive shaft 103. The main gear wheel 102 is hollow and provided with a slide quick-return mechanism 105. The quick-return mechanism 105 includes an eccentric structure 106 provided at the center of the main gearwheel 102, a pin 108 attached to the structure 106, a pin 109 attached to the main gear wheel 102 at the periphery thereof and a link 107 connecting pins 108 and 109. When rotation of the drive pinion 104 causes the main gearwheel 102 to rotate, the crankshaft 1 imparts quick-return up-and-down movement to the slide 101.

Figure 5:
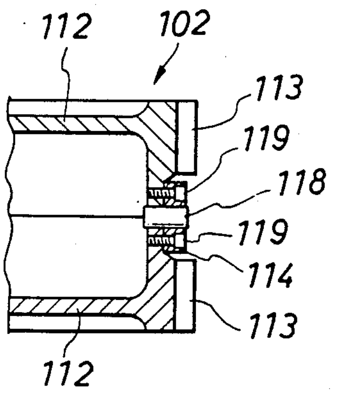
FIG. 5 is a sectional view taken on line V—V of FIG. 3.

The crankshaft mechanism can be used in a press of the type shown in FIGS. 3-5 in combination with apparatus for stopping the press at a desired stop position. While the embodiment shown employs a quick-return mechanism, the stop position correcting device to be described hereinafter can be mounted on any type of press.

The drive shaft 103 for the drive pinion 104 has on end thereof protruding from a unit casing, at which end there is provided a clutch unit 110 including a flywheel. A brake unit 111 is attached to the other end of drive shaft 103. The flywheel is provided for driving the press.

As best shown in FIGS. 3 and 5, the main gearwheel 102 comprises two-part pan-like members 112 connected together by an annular bottom portion 114. Members 112 are provided with teeth 113, except on the connecting portion. The drive pinion 104 has two series of teeth 115 which engage with the teeth 113 formed on the main gearwheel 102.

The crown 100 is provided with air cylinders 116 which are positioned perpendicular to the rotational axis of the main gearwheel 102 at the outer diameter thereof. Piston rods 117 protrude toward the bottom portion 114 of the main gearwheel 102, and are adapted to engage with stop blocks 118 provided at the bottom portion 114 and spaced about the gearwheel 102 by an angle of 180 degrees. The main gearwheel 102, having the teeth 113 thereon, comprises two parts, the connection therebetween being formed as the bottom portion 114 to which the stop blocks are fastened by set screws 119.

The lengths of the piston rods 117 of the air cylinders 116 are adjusted to set the main gearwheel 102 at a particular predetermined angle of the crankshaft, for example the bottom dead center, when the piston rods are extended to the maximum amount. The rods 117 engage the stop blocks 118 when they are extended and, when retracted, are maintained clear of the main gearwheel 102 so that it can freely rotate. Numeral 120 designates an air supply tube connected to the air cylinders 116, 121 is an electromagnetic valve for controlling the air supply, and 122 is an air supply source.

During normal operation of the press, the piston rods of the air cylinders 116 are retracted so that they are not in contact with the stop blocks 118 of the main gearwheel 102. In order to prepare the press for stopping at a desired position, for example the bottom dead center, the press is stopped at the desired position by engaging the clutch and brake of the clutch unit 110 and brake unit 111 respectively. Thereafter air is supplied to the air cylinders 116 by releasing the brake and controlling the electromagnetic valve 121 to extend the piston rods 117 so that they press against the stop blocks 118 of the main gearwheel 102. When the main gearwheel 102 fails to reach or overruns the stop position, one of the piston rods 117 engages its associated stop block 118 and the gearwheel 102 is rotated slightly thereby bringing the slide 101 to the correct position.

It will be understood that the above description of the present invention is susceptible to various modifications, changes and adaptations, and the same are intended to be comprehended within the meaning and range of equivalents of the appended claims.

We claim:

1. A crankshaft mechanism comprising housing;

an eccentric crankshaft including a first cylindrical portion having a first diameter and being rotatable within said housing about a longitudinal axis, said crankshaft further including a second portion having a second diameter greater than said first diameter and a first radial bore, the center of said second portion being displaced radially from said longitudinal axis;

an eccentric sheave rotatably mounted on the outer circumference of the second portion of said eccentric crankshaft and having an outer circumference with a center displaced radially from the center of the second portion of said crankshaft, said eccentric sheave having a second radial bore therein;

a connecting member rotatably mounted on the outer circumference of said eccentric sheave and having a third radial bore therein, said first, second and third radial bores being in alignment when said crankshaft is at a predetermined bottom dead center position;

locking means located within said radial bores, said locking means being movable to a first position wherein it is within said first and second bores and locks said crankshaft to said sheave, said connecting member being movable with respect to said sheave when said locking means is in said first position, said locking means being further movable to a second position wherein it is within said second and third bores and locks said sheave to said connecting member, said sheave being movable with respect to said crankshaft when said locking means is in said second position; and actuating means for positioning said locking means at one of said first and second positions.

2. A crankshaft mechanism as defined by claim 1 wherein said locking means comprises a lock pin having first and second pistons at each end thereof, an auxiliary piston and a connection rod connecting said second piston to said auxiliary piston, and wherein said actuating means comprises first and second hydraulic passages, said locking means being driven to said first position when fluid in said first hydraulic passage actuates said first piston thereby driving said auxiliary piston into said first and second bores and locking said crankshaft to said sheave, said locking means being driven into said second position when fluid in said second hydraulic passages actuates said second piston thereby driving said lock pin into said second and third bores and locking said sheave to said connecting member.

3. A crankshaft mechanism as defined by claim 2 wherein the third bore in said connecting member is provided with a plug body having an aperture therein, a second connecting rod attached to said first piston extending through the aperture in said plug body.

* * * * *